R. RUHLMAN.
Combined Shutter-Fasteners and Bowers.
No. 143,189. Patented September 23, 1873.
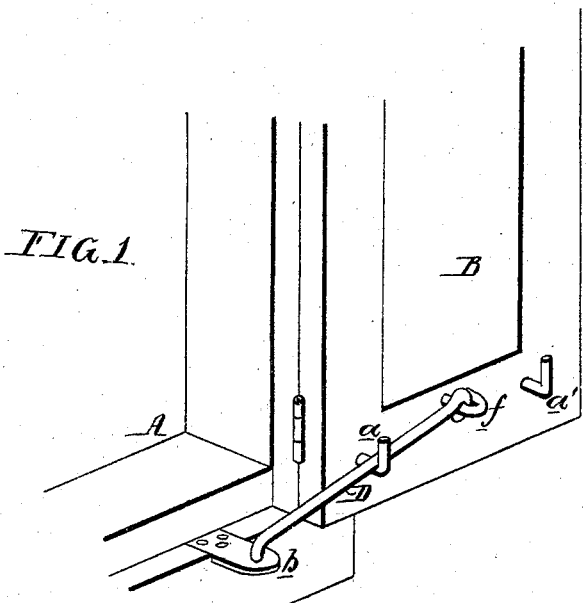
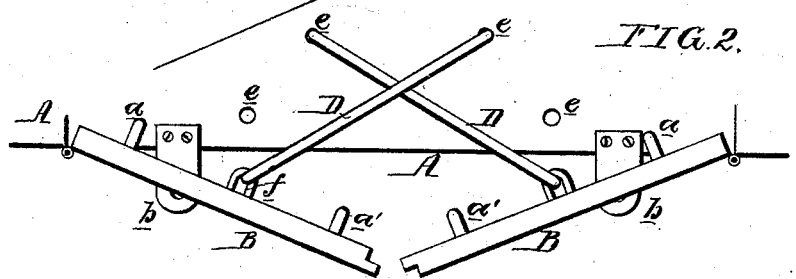
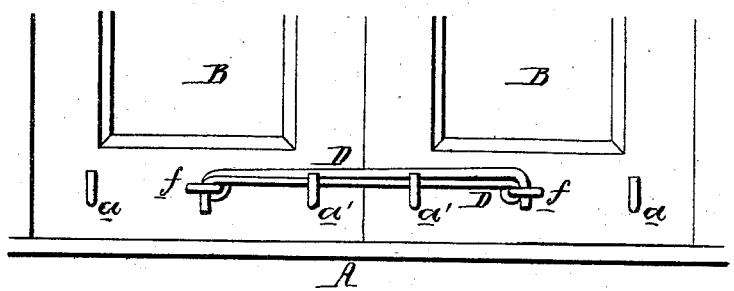

UNITED STATES PATENT OFFICE.

RUDOLPH RUHLMAN, OF TRENTON, NEW JERSEY.

IMPROVEMENT IN COMBINED SHUTTER FASTENERS AND BOWERS.

Specification forming part of Letters Patent No. 143,189, dated September 23, 1873; application filed September 1, 1873.

*To all whom it may concern:*

Be it known that I, RUDOLPH RUHLMAN, of the city of Trenton, county of Mercer, State of New Jersey, have invented an Improved Shutter Fastener and Bower, of which the following is a specification:

The object of my invention is to fasten the shutters of a window when either opened or closed, or when partly opened, by means of the same devices; and I attain this object by the combination, with a window-frame, A, and shutters B B, of hooked rods D D, hung to the said shutters, and adapted to hooks $a$ $a'$ on the same, to perforated plates $b$, secured to the window-frame, and to holes $e$ in the latter, all as plainly shown in the perspective view, Figure 1, plan view, Fig. 2, and elevation, Fig. 3, of the accompanying drawing.

Each hooked rod D is hung to a staple, $f$, driven into the lower portion of the shutter at about the center of the same, and the hooks $a$ $a'$ are situated near the opposite edges of the shutter, and equidistant, or thereabout, from the said staple. The perforated plates $b$ are secured in a horizontal position to the sill of the window-frame, from which they project, as shown, and the holes $e$ $e$ may be bored directly in the frame, or may be formed in plates secured to the same.

To fasten the shutter when fully opened, as shown in Fig. 1, its hooked rod D is passed over the hook $a$, and its end inserted into the hole in the plate $b$, the latter and the hook $a$ effectually locking both the said rod and shutter, and preventing the slightest movement of either.

When the shutter is to be closed the hooked rod is simply disengaged from the plate $b$ and hook $a$, when it will serve as a convenient handle for drawing in the shutter. After both shutters have been closed, as shown in Fig. 3, the hooked rod D of each is inserted into the staple $f$ of the opposite rod after having been passed across and caught by both hooks $a$ and $a'$, thus rigidly locking the said shutters.

To bow the shutters, or fasten them when partly opened, the hooked ends of the rods D are simply inserted into the holes $e$ in the window-frame, as shown in Fig. 2, there being two or more holes for each hook, so as to enable the shutter to be fastened when adjusted to any position required.

I claim as my invention—

The combination, with a window-frame and shutters, of hooked rods D D, hung to the said shutters, and adapted to hooks $a$ $a'$ on the same, to perforated plates secured to the window-frame, and to holes in the latter, as set forth.

In testimony whereof I have signed my name to this specification in the presence of two subscribing witnesses.

RUDOLPH RUHLMAN.

Witnesses:
A. P. RUTHERFORD,
HUBERT HOWSON.